(12) United States Patent
Nakamizo et al.

(10) Patent No.: US 8,798,220 B2
(45) Date of Patent: Aug. 5, 2014

(54) SIGNAL SOURCE SYNCHRONIZATION CIRCUIT

(71) Applicant: Mitsubishi Electric Corporation, Chiyoda-ku (JP)

(72) Inventors: Hideyuki Nakamizo, Tokyo (JP); Kenichi Tajima, Tokyo (JP); Nobuhiko Ando, Tokyo (JP); Kenji Kawakami, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 13/860,957

(22) Filed: Apr. 11, 2013

(65) Prior Publication Data

US 2013/0287155 A1 Oct. 31, 2013

(30) Foreign Application Priority Data

Apr. 25, 2012 (JP) .................................. 2012-99962

(51) Int. Cl.
  *H04L 7/04* (2006.01)
  *H04L 7/00* (2006.01)

(52) U.S. Cl.
  USPC .......................................... 375/362; 375/354

(58) Field of Classification Search
  USPC .................................................. 375/362, 354
  See application file for complete search history.

(56) References Cited

U.S. PATENT DOCUMENTS

| 2005/0008113 A1* | 1/2005 | Kokubo et al. ............... 375/376 |
| 2007/0012522 A1* | 1/2007 | Chida ............................ 187/393 |
| 2009/0256640 A1* | 10/2009 | Reilly et al. ..................... 331/45 |

FOREIGN PATENT DOCUMENTS

JP 2010-283770 12/2010

OTHER PUBLICATIONS

"Multiple Source Synchronization for MIMO", MG3700A Vector Signal Generator, Application Note, Anritsu, Sep. 2007, 28 pages.

* cited by examiner

*Primary Examiner* — Chieh M Fan
*Assistant Examiner* — Brian J Stevens
(74) *Attorney, Agent, or Firm* — Oblon, Spivak, McClelland, Maier & Neustadt, L.L.P.

(57) ABSTRACT

A signal source synchronization circuit includes: a first TDC circuit that measures a first path delay time which is a time difference between an input time of a trigger signal to a first input terminal and an input time of the trigger signal to a second input terminal; and a second TDC circuit that measures a second path delay time which is a time difference between an input time of the trigger signal to a first input terminal and an input time of the trigger signal to a second input terminal, wherein a first phase shifter adjustment circuit sets a phase adjustment amount corresponding to the first path delay time in a first phase shifter, and a second phase shifter adjustment circuit sets a phase adjustment amount corresponding to the second path delay time in a second phase shifter.

18 Claims, 5 Drawing Sheets

SIGNAL SOURCE SYNCHRONIZATION CIRCUIT

BACKGROUND OF THE INVENTION

1. Field of the Invention

The present invention relates to a signal source synchronization circuit that achieves synchronization of frequencies and phases among a plurality of signal source circuits.

2. Description of Related Art

For example, in a signal source synchronization circuit disclosed in *MIMO NOTAMENO TASHINGOGEN NO DOUKIKA* (Multiple Source Synchronization for MIMO), Application Note, Anritsu, September 2007, synchronization of frequencies is achieved by inputting a signal of 10 MHz outputted from a reference signal source to two measuring instruments, and synchronization of phases of two measuring instruments is achieved by a trigger signal outputted from a trigger generator.

Since the conventional signal source synchronization circuit is structured as mentioned above, in a case where distances between the signal source circuits and the trigger generator are not the same, an arrival time of the trigger signal differs depending on the distance. As a result, there is a problem such that variations in signal timing occur in the signal source circuits and accuracy in synchronization is degraded.

SUMMARY OF THE INVENTION

The present invention is made to solve the aforementioned problem, and an object thereof is to obtain a signal source synchronization circuit capable of enhancing the accuracy in synchronization among the individual signal source circuits.

A signal source synchronization circuit according to the invention includes: a reference signal source that generates a reference signal; a first signal source circuit that adjusts a phase of the reference signal generated by the reference signal source and generates a signal synchronized with the reference signal after the phase adjustment; a second signal source circuit that adjusts a phase of the reference signal generated by the reference signal source and generates a signal synchronized with the reference signal after the phase adjustment; a trigger signal generation circuit that outputs a trigger signal; a first time difference measurement circuit that has a first input terminal to which the trigger signal outputted from the trigger signal generation circuit is directly inputted and a second input terminal to which the trigger signal outputted from the trigger signal generation circuit and then fed back via the first signal source circuit is inputted, and measures a time difference between an input time of the trigger signal to the first input terminal and an input time of the trigger signal to the second input terminal; and a second time difference measurement circuit that has a first input terminal to which the trigger signal outputted from the trigger signal generation circuit is directly inputted and a second input terminal to which the trigger signal outputted from the trigger signal generation circuit and then fed back via the second signal source circuit is inputted, and measures a time difference between an input time of the trigger signal to the first input terminal and an input time of the trigger signal to the second input terminal, wherein the first signal source circuit adjusts the phase of the reference signal according to the time difference measured by the first time difference measurement circuit, and the second signal source circuit adjusts the phase of the reference signal according to the time difference measured by the second time difference measurement circuit.

According to the invention, it is configured to include: the first time difference measurement circuit that measures the time difference between the input time of the trigger signal to the first input terminal and the input time of the trigger signal (the trigger signal fed back via the first signal source circuit) to the second input terminal and the second time difference measurement circuit that measures the time difference between the input time of the trigger signal to the first input terminal and the input time of the trigger signal (the trigger signal fed back via the second signal source circuit) to the second input terminal, wherein the first signal source circuit adjusts the phase of the reference signal according to the time difference measured by the first time difference measurement circuit, and the second signal source circuit adjusts the phase of the reference signal according to the time difference measured by the second time difference measurement circuit, and hence there is an advantageous effect such that accuracy in synchronization between the individual signal source circuits can be enhanced.

DETAILED DESCRIPTION OF THE PREFERRED EMBODIMENTS

In the following, embodiments of the present invention will be described with reference to the attached drawings.

Embodiment 1

Figure 1:
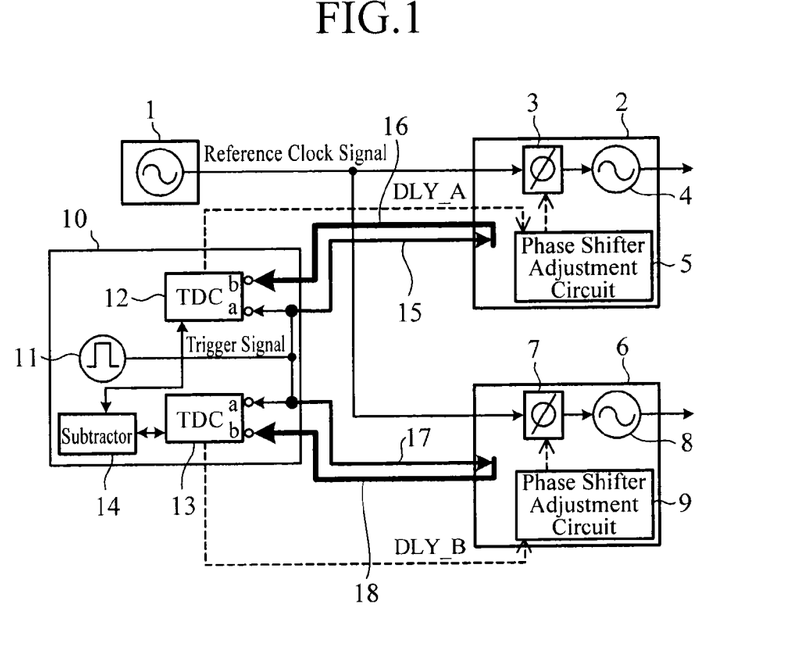
FIG. 1 is a block diagram showing a signal source synchronization circuit according to Embodiment 1 of the present invention.

FIG. 1 is a block diagram showing a signal source synchronization circuit according to Embodiment 1 of the invention.

In FIG. 1, a reference signal source 1 is a signal source that generates a reference clock signal (reference signal).

A signal source circuit 2 is constituted by a phase shifter 3, a local oscillator 4, and a phase shifter adjustment circuit 5, adjusts the phase of the reference clock signal generated by the reference signal source 1, and generates a signal synchronized with the reference clock signal after the phase adjustment. Note that the signal source circuit 2 constitutes a first signal source circuit.

The phase shifter 3 of the signal source circuit 2 adjusts the phase of the reference clock signal generated by the reference signal source 1 by a phase adjustment amount set by the phase shifter adjustment circuit 5.

The local oscillator 4 generates a signal synchronized with the reference clock signal having the phase adjusted by the phase shifter 3.

The phase shifter adjustment circuit 5 sets the phase adjustment amount corresponding to a time difference indicated by a time difference information DLY_A outputted from a TDC circuit 12 in the phase shifter 3.

A signal source circuit 6 is constituted by a phase shifter 7, a local oscillator 8, and a phase shifter adjustment circuit 9, adjusts the phase of the reference clock signal generated by the reference signal source 1, and generates the signal synchronized with the reference clock signal after the phase adjustment. Note that the signal source circuit 6 constitutes a second signal source circuit.

The phase shifter 7 of the signal source circuit 6 adjusts the phase of the reference clock signal generated by the reference signal source 1 by the phase adjustment amount set by the phase shifter adjustment circuit 9.

The local oscillator 8 generates a signal synchronized with the reference clock signal having the phase adjusted by the phase shifter 7.

The phase shifter adjustment circuit 9 sets the phase adjustment amount corresponding to a time difference indicated by a time difference information DLY_B outputted from a TDC circuit 13 in the phase shifter 7.

A trigger generator 10 is constituted by the TDC (Time to Digital Converter) circuits 12 and 13 and a subtractor 14, and generates a trigger signal and also outputs the pieces of time difference information DLY_A and DLY_B.

A trigger signal generation circuit 11 of the trigger generator 10 is a circuit that outputs the trigger signal.

The TDC circuit 12 has an input terminal a (a first input terminal) to which the trigger signal outputted from the trigger signal generation circuit 11 is directly inputted and an input terminal b (a second input terminal) to which the trigger signal outputted from the trigger signal generation circuit 11, inputted to the signal source circuit 2 through a signal path 15, and fed back through a feedback path 16 is inputted, and measures a time difference between the input time of the trigger signal to the input terminal a and the input time of the trigger signal to the input terminal b.

In addition, the TDC circuit 12 outputs the time difference information DLY_A indicative of the above time difference to the phase shifter adjustment circuit 5.

Note that the TDC circuit 12 constitutes a first time difference measurement circuit.

The TDC circuit 13 has an input terminal a (a first input terminal) to which the trigger signal outputted from the trigger signal generation circuit 11 is directly inputted and an input terminal b (a second input terminal) to which the trigger signal outputted from the trigger signal generation circuit 11, inputted to the signal source circuit 6 through a signal path 17, and fed back through a feedback path 18 is inputted, and measures a time difference between the input time of the trigger signal to the input terminal a and the input time of the trigger signal to the input terminal b.

In addition, the TDC circuit 13 outputs the time difference information DLY_B indicative of the above time difference to the phase shifter adjustment circuit 9.

Note that the TDC circuit 13 constitutes a second time difference measurement circuit.

The subtractor 14 calculates a difference between half of the time difference measured by the TDC circuit 12 and half of the time difference measured by the TDC circuit 13.

The phase adjustment amount set by the phase shifter adjustment circuit 9 is different in comparison with the phase adjustment amount set by the phase shifter adjustment circuit 5 by the phase amount corresponding to the difference calculated by the subtractor 14.

Next, an operation thereof will be described.

The reference clock signal generated from the reference signal source 1 is inputted to each of the phase shifters 3 and 7 of the signal source circuits 2 and 6.

The trigger signal outputted from the trigger signal generation circuit 11 is directly inputted to each of the input terminals a of the TDC circuits 12 and 13.

In addition, the trigger signal outputted from the trigger signal generation circuit 11 is inputted to the signal source circuit 2 through the signal path 15, then fed back to the trigger generator 10 through the feedback path 16, and inputted to the input terminal b of the TDC circuit 12.

Similarly, the trigger signal outputted from the trigger signal generation circuit 11 is inputted to the signal source circuit 6 through the signal path 17, then fed back to the trigger generator 10 through the feedback path 18, and inputted to the input terminal b of the TDC circuit 13.

The TDC circuit 12 calculates the time difference between the input time of the trigger signal to the input terminal a and the input time of the trigger signal to the input terminal b.

The time difference is a path delay time $\tau a1$ occurring in the signal path 15 and the feedback path 16, and the lengths of the signal path 15 and the feedback path 16 are the same, and hence a path delay time $\tau b1$ occurring in the signal path 15 is half of the path delay time $\tau a1$ occurring in the signal path 15 and the feedback path 16.

The TDC circuit 12 measures the path delay time $\tau a1$ occurring in the signal path 15 and the feedback path 16, and then outputs the time difference information DLY_A indicative of the path delay time $\tau a1$ to the phase shifter adjustment circuit 5.

When receiving the time difference information DLY_A from the TDC circuit 12, the phase shifter adjustment circuit 5 sets the phase adjustment amount corresponding to the path delay time $\tau a1$ indicated by the time difference information DLY_A in the phase shifter 3.

The TDC circuit 13 measures the time difference between the input time of the trigger signal to the input terminal a and the input time of the trigger signal to the input terminal b.

The time difference is a path delay time $\tau a2$ caused at the signal path 17 and the feedback path 18, and the path lengths of the signal path 17 and the feedback path 18 are the same and hence a path delay time $\tau b2$ caused at the signal path 17 is half of the path delay time $\tau a2$ caused at the signal path 17 and the feedback path 18.

The TDC circuit 13 measures the path delay time $\tau a2$ occurring in the signal path 17 and the feedback path 18, and then outputs the time difference information DLY_B indicative of the path delay time $\tau a2$ to the phase shifter adjustment circuit 9.

When receiving the time difference information DLY_B from the TDC circuit 13, the phase shifter adjustment circuit 9 sets the phase adjustment amount corresponding to the path delay time $\tau a2$ indicated by the time difference information DLY_B in the phase shifter 7.

When the TDC circuit 12 measures the path delay time $\tau a1$ and the TDC circuit 13 measures the path delay time $\tau a2$, the subtractor 14 calculates a difference $\tau c$ between the path delay time $\tau b1$ that is half of the path delay time $\tau a1$ and the path delay time $\tau b2$ that is half of the path delay time $\tau a2$.

$$\tau c = \tau b1 - \tau b2 \qquad (1)$$

As described above, the phase shifter adjustment circuit 5 sets the phase adjustment amount corresponding to the path delay time $\tau a1$ in the phase shifter 3 and the phase shifter adjustment circuit 9 sets the phase adjustment amount corresponding to the path delay time $\tau a2$ in the phase shifter 7. The phase adjustment amount corresponding to the path delay time τa2 is in comparison with the phase adjustment amount corresponding to the path delay time τa1 by the phase amount corresponding to the difference τc calculated by the subtractor 14.

Specifically, in a case where the length of the signal path 15 and the feedback path 16 is longer than the length of the signal path 17 and the feedback path 18, and hence the path delay time τa1 is longer than the path delay time τa2, in order to cause the phases of the reference clock signals outputted from the phase sifters 3 and 7 to coincide with each other, the phase adjustment amount set in the phase shifter 7 is made larger than the phase adjustment amount set in the phase shifter 3 by the phase amount corresponding to the difference τc.

Conversely, in a case where the length of the signal path 17 and the feedback path 18 is longer than the length of the signal path 15 and the feedback path 16, and hence the path delay time τa2 is longer than the path delay time τa1, in order to cause the phases of the reference clock signals outputted from the phase shifters 3 and 7 to coincide with each other, the phase adjustment amount set in the phase shifter 3 is made larger than the phase adjustment amount set in the phase shifter 7 by the phase amount corresponding to the difference τc.

The phase shifter 3 of the signal source circuit 2 adjusts the phase of the reference clock signal generated by the reference signal source 1 by the phase adjustment amount set by the phase shifter adjustment circuit 5, and outputs the reference clock signal after the phase adjustment to the local oscillator 4.

When receiving the reference clock signal after the phase adjustment from the phase shifter 3, the local oscillator 4 of the signal source circuit 2 generates the signal synchronized with the reference clock signal.

The phase shifter 7 of the signal source circuit 6 adjusts the phase of the reference clock signal generated by the reference signal source 1 by the phase adjustment amount set by the phase shifter adjustment circuit 9, and outputs the reference clock signal after the phase adjustment to the local oscillator 8.

When receiving the reference clock signal after the phase adjustment from the phase shifter 7, the local oscillator 8 of the signal source circuit 6 generates the signal synchronized with the reference clock signal.

As is apparent from the foregoing, according to Embodiment 1, it is configured to include: the TDC circuit 12 that measures the path delay time τa1 that is the time difference between the input time of the trigger signal to the input terminal a and the input time of the trigger signal to the input terminal b; and the TDC circuit 13 that measures the path delay time τa1 that is the time difference between the input time of the trigger signal to the input terminal a and the input time of the trigger signal to the input terminal b, wherein the phase shifter adjustment circuit 5 sets the phase adjustment amount corresponding to the path delay time τa1 in the phase shifter 3, and the phase shifter adjustment circuit 9 sets the phase adjustment amount corresponding to the path delay time τa2 in the phase shifter 7, and hence there is rendered an advantageous effect such that accuracy in synchronization between the signal source circuit 2 and the signal source circuit 6 can be enhanced.

Although Embodiment 1 has shown an example in which the phases of the signal generated by the signal source circuit 2 and the signal generated by the signal source circuit 6 are caused to coincide with each other, the phase adjustment amount of each of the phase shifters 3 and 7 may be set so that the phase difference between the two signals has a desired value.

Although Embodiment 1 has shown an example in which the signal path 15 and the feedback path 16 are different paths, the signal path 15 may also serve as the feedback path 16 with a device that reflects the signal provided at the end portion on the side of the signal source circuit 2 of the signal path 15.

Similarly, although Embodiment 1 has shown an example in which the signal path 17 and the feedback path 18 are different paths, the signal path 17 may also serve as the feedback path 18 in such a manner that a device that reflects the signal is provided at the end portion on the side of the signal source circuit 6 of the signal path 17.

Although Embodiment 1 has shown an example in which the frequencies of the trigger signals passing through the signal path 15 and the feedback path 16 are the same, the frequencies of the trigger signals passing through the signal path 15 and the feedback path 16 may be made different from each other in such a manner that, for example, a frequency converter is provided in the connection portion of the signal path 15 and the feedback path 16 in the signal source circuit 2 (or on the path of the signal path 15 or the feedback path 16).

Similarly, although Embodiment 1 has shown an example in which the frequencies of the trigger signals passing through the signal path 17 and the feedback path 18 are the same, the frequencies of the trigger signals passing through the signal path 17 and the feedback path 18 may be made different from each other in such a manner that, for example, a frequency converter is provided in the connection portion of the signal path 17 and the feedback path 18 in the signal source circuit 6 (or on the path of the signal path 17 or the feedback path 18).

Although Embodiment 1 has shown an example in which the TDC circuits 12 and 13 measure the path delay times τa1 and τa2, in a case where the delay difference occurring between the signal source circuits 2 and 6 is sufficiently short relative to the cycle of the reference clock signal, even when a phase comparator is used instead of the TDC circuits 12 and 13, the path delay times τa1 and τa2 can be measured.

Although Embodiment 1 has shown an example in which the number of signal source circuits is two, the number of signal source circuits may be N (N is a natural number not less than 3).

In a case where the number of signal source circuits is N (in a case where there are N signal source circuits each corresponding to the signal source circuit 2), N TDC circuits are implemented (N TDC circuits each corresponding to the TDC circuit 12 are implemented).

At this point, the phase shifter adjustment circuit of the n-th (n=1, 2, . . . , N) signal source circuit adjusts the phase of the reference clock signal by setting the phase adjustment amount corresponding to a path delay time Tan that is the time difference measured by the n-th TDC circuit in the phase shifter.

Thus, even in the case where the number of signal source circuits is N, it is possible to obtain the same effect as in the case where the number of signal source circuits is two.

Embodiment 2

Although Embodiment 1 described above has shown an example in which the trigger signal outputted from the trigger signal generation circuit 11 is inputted to each of the signal source circuits 2 and 6 and then fed back, in a case where the distance from the trigger signal generation circuit 11 to each of the signal source circuits 2 and 6 is long, path lengths of the signal paths 15 and 17 and the feedback paths 16 and 18 to the signal source circuits 2 and 6 are increased, respectively. As a result, it is necessary to prepare cables having a long path length corresponding to the number of the signal source circuits.

In Embodiment 2, the number of the cables having a long path length is reduced in the following manner.

Figure 2:
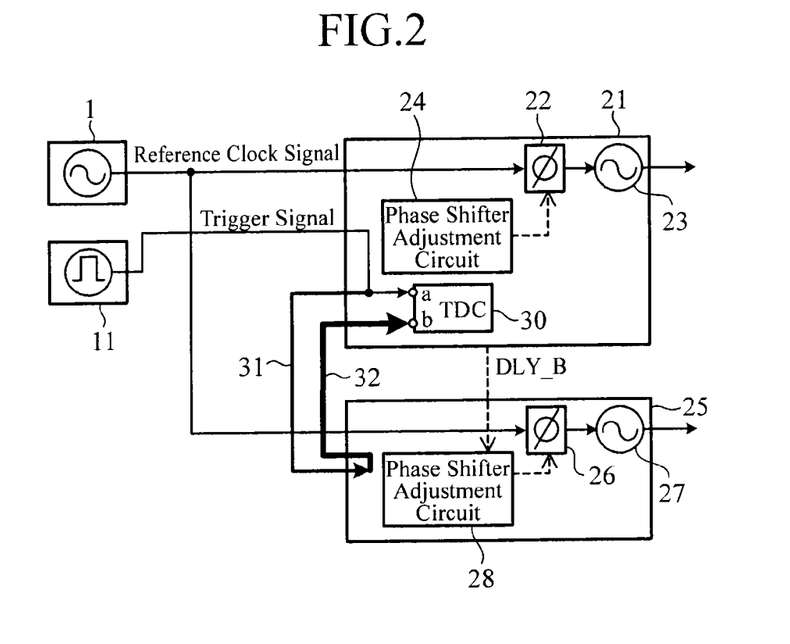
FIG. 2 is a block diagram showing a signal source synchronization circuit according to Embodiment 2 of the invention.

FIG. 2 is a block diagram showing a signal source synchronization circuit according to Embodiment 2 of the invention. In the drawing, the same reference numerals as those in FIG. 1 denote the same or equivalent portions, and hence descriptions thereof will be omitted.

A signal source circuit 21 is constituted by a phase shifter 22, a local oscillator 23, a phase shifter adjustment circuit 24, and a TDC circuit 30, adjusts the phase of the reference clock signal generated by the reference signal source 1, and generates the signal synchronized with the reference clock signal after the phase adjustment. Note that the signal source circuit 21 constitutes a first signal source circuit.

The phase shifter 22 of the signal source circuit 21 adjusts the phase of the reference clock signal generated by the reference signal source 1 by the phase adjustment amount set by the phase shifter adjustment circuit 24.

The local oscillator 23 generates the signal synchronized with the reference clock signal having the phase adjusted by the phase shifter 22.

The phase shifter adjustment circuit 24 sets a predetermined phase adjustment amount in the phase shifter 22.

A signal source circuit 25 is constituted by a phase shifter 26, a local oscillator 27, and a phase shifter adjustment circuit 28, adjusts the phase of the reference clock signal generated by the reference signal source 1, and generates the signal synchronized with the reference clock signal after the phase adjustment. Note that the signal source circuit 25 constitutes a second signal source circuit.

The phase shifter 26 of the signal source circuit 25 adjusts the phase of the reference clock signal generated by the reference signal source 1 by the phase adjustment amount set by the phase shifter adjustment circuit 28.

The local oscillator 27 generates the signal synchronized with the reference clock signal having the phase adjusted by the phase shifter 26.

The phase shifter adjustment circuit 28 sets the phase adjustment amount corresponding to the time difference indicated by the time difference information DLY_B outputted from the TDC circuit 30 in the phase shifter 26.

The TDC circuit 30 is implemented in the signal source circuit 21, has an input terminal a (a first input terminal) to which the trigger signal outputted from the trigger signal generation circuit 11 is directly inputted and an input terminal b (a second input terminal) to which the trigger signal outputted from the trigger signal generation circuit 11, inputted to the signal source circuit 21, inputted to the signal source circuit 25 through a signal path 31, and fed back through a feedback path 32 is inputted, and measures the time difference between the input time of the trigger signal to the input terminal a and the input time of the trigger signal to the input terminal b.

In addition, the TDC circuit 30 outputs the time difference information DLY_B indicative of the above time difference to the phase shifter adjustment circuit 28.

Note that the TDC circuit 30 constitutes a time difference measurement circuit.

Next, an operation thereof will be described.

The reference clock signal generated from the reference signal source 1 is inputted to each of the phase shifters 22 and 26 of the signal source circuits 21 and 25.

The trigger signal outputted from the trigger signal generation circuit 11 is directly inputted to the input terminal a of the TDC circuit 12.

In addition, the trigger signal outputted from the trigger signal generation circuit 11 is inputted to the signal source circuit 25 through the signal path 31, fed back to the signal source circuit 21 through the feedback path 32, and inputted to the input terminal b of the TDC circuit 30.

The TDC circuit 30 measures the time difference between the input time of the trigger signal to the input terminal a and the input time of the trigger signal to the input terminal b.

The time difference is the path delay time $\tau a1$ occurring in the signal path 31 and the feedback path 32, and the path lengths of the signal path 31 and the feedback path 32 are the same, and hence the path delay time $\tau b1$ occurring in the signal path 31 is half of the path delay time $\tau a1$ occurring in the signal path 31 and the feedback path 32.

$$\tau b1 = \tau a1/2 \qquad (2)$$

Here, when the phase of the signal generated by the signal source circuit 21 is compared with the phase of the signal generated by the signal source circuit 25, the phases thereof are shifted from each other by the phase corresponding to the path delay time $\tau b1$ occurring in the signal path 31.

Then, the TDC circuit 30 outputs the time difference information DLY_B indicative of the path delay time $\tau b1$ occurring in the signal path 31 to the phase shifter adjustment circuit 28.

When receiving the time difference information DLY_B from the TDC circuit 30, the phase shifter adjustment circuit 28 sets the phase adjustment amount corresponding to the path delay time $\tau b1$ indicated by the time difference information DLY_B in the phase shifter 26.

Specifically, in order to cause the phases of the reference clock signals outputted from the phase shifters 22 and 26 to coincide with each other, the phase shifter adjustment circuit 28 performs control such that the phase of the reference clock signal is advanced by the phase corresponding to the path delay time $\tau b1$.

The phase shifter 26 of the signal source circuit 25 adjusts the phase of the reference clock signal generated by the reference signal source 1 by the phase adjustment amount set by the phase shifter adjustment circuit 28, and outputs the reference clock signal after the phase adjustment to the local oscillator 27.

When receiving the reference clock signal after the phase adjustment from the phase shifter 26, the local oscillator 27 of the signal source circuit 25 generates the signal synchronized with the reference clock signal.

As is apparent from the foregoing, according to Embodiment 2, it is configured to include: the TDC circuit 30 that measures the path delay time $\tau a1$ that is the time difference between the input time of the trigger signal to the input terminal a and the input time of the trigger signal to the input terminal b, wherein the phase shifter adjustment circuit 28 sets the phase adjustment amount corresponding to $\tau b1$ that is half of the path delay time $\tau a1$ to the phase shifter 26, and hence there is obtained an advantageous effect such that a single cable having a long path length has only to be provided, in addition to the effect such that the accuracy in synchronization between the signal source circuit 21 and the signal source circuit 25 can be enhanced.

Although Embodiment 2 has shown an example in which the phases of the signal generated by the signal source circuit 21 and the signal generated by the signal source circuit 25 are caused to coincide with each other, the phase adjustment amount of the phase shifter 26 may be set so that the phase difference between the two signals has a desired value.

Although Embodiment 2 has shown an example in which the signal path 31 and the feedback path 32 are different paths, the signal path 31 may also serve as the feedback path 32 in such a manner that a device that reflects the signal is provided at the end portion on the side of the signal source circuit 25 of the signal path 31.

Although Embodiment 2 has shown an example in which the frequencies of the trigger signals passing through the signal path 31 and the feedback path 32 are the same, the frequencies of the trigger signals passing through the signal path 31 and the feedback path 32 may be made different from each other in such a manner that, for example, a frequency converter is provided in the connection portion of the signal path 31 and the feedback path 32 in the signal source circuit 25 (or on the path of the signal path 31 or the feedback path 32).

Although Embodiment 2 has shown an example in which the TDC circuit 30 measures the path delay time $\tau a1$, in a case where the delay difference occurring between the signal source circuits 21 and 25 is sufficiently short relative to the cycle of the reference clock signal, even when a phase comparator is used instead of the TDC circuit 30, it is possible to measure the path delay time $\tau a1$.

Although Embodiment 2 has shown an example in which the number of signal source circuits is two, the number of signal source circuits may be N (N is a natural number not less than 3).

In a case where the number of signal source circuits is N (in a case where there are N signal source circuits each corresponding to the signal source circuit 21), the TDC circuit 30 has the input terminal a to which the trigger signal outputted from the trigger signal generation circuit 11 is directly inputted and the input terminal b to which the trigger signal outputted from the trigger signal generation circuit 11, inputted to the signal source circuit 21, and fed back via the n-th (n=2, 3, . . . , N) signal source circuit is inputted, and measures the path delay time $\tau an$ that is the time difference between the input time of the trigger signal to the input terminal a and the input time of the trigger signal to the input terminal b.

The phase shifter adjustment circuit of the n-th signal source circuit adjusts the phase of the reference clock signal by setting the phase adjustment amount corresponding to $\tau bn$ that is half of the path delay time $\tau an$ that is the time difference measured by the TDC circuit 30 in the phase shifter 26.

Thus, even in the case where the number of signal source circuits is N, it is possible to obtain the same effect as in the case where the number of signal source circuits is two.

Embodiment 3

Although Embodiment 1 described above has shown an example in which the trigger signal generation circuit 11 is implemented in addition to the reference signal source 1, the phases of the signal generated by the signal source circuit 2 and the signal generated by the signal source circuit 6 may be caused to coincide with each other by using the reference clock signal without implementing the trigger signal generation circuit 11.

In a case where the phase difference between the signal generated by the signal source circuit 2 and the signal generated by the signal source circuit 6 is sufficiently small relative to the cycle of the reference clock signal, it is possible to detect the phase difference by comparing the rising edge timings of the reference clock signals.

Figure 3:
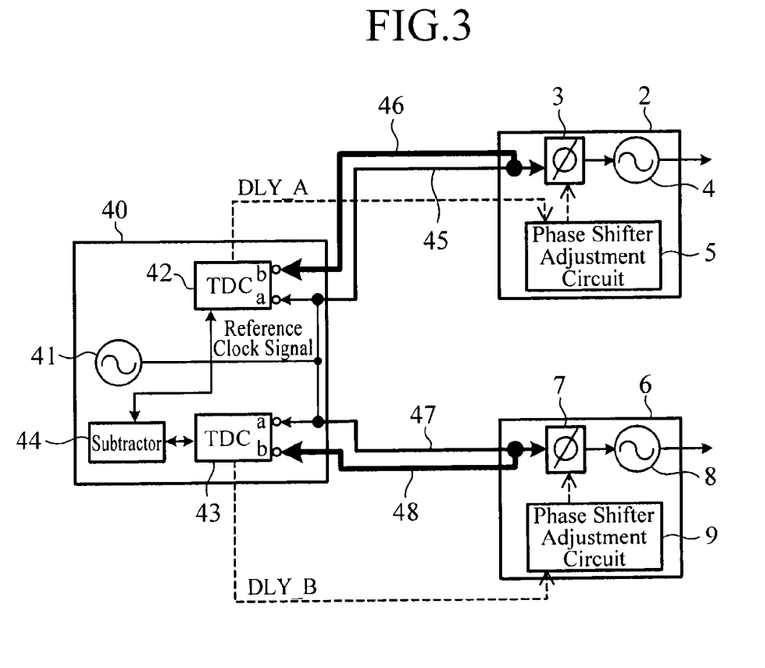
FIG. 3 is a block diagram showing a signal source synchronization circuit according to Embodiment 3 of the invention.

FIG. 3 is a block diagram showing a signal source synchronization circuit according to Embodiment 3 of the invention. In the drawing, the same reference numerals as those in FIG. 1 denote the same or equivalent portions, and hence description thereof will be omitted.

A reference clock signal generator 40 is constituted by a reference signal source 41, TDC circuits 42 and 43, and a subtractor 44, and generates the reference clock signal and also outputs the pieces of time difference informations DLY_A and DLY_B.

The reference signal source 41 of the reference clock signal generator 40 is a signal source that generates the reference clock signal.

The TDC circuit 42 has an input terminal a (a first input terminal) to which the reference clock signal generated by the reference signal source 41 is directly inputted and an input terminal b (a second input terminal) to which the reference clock signal generated by the reference signal source 41, inputted to the signal source circuit 2 through a signal path 45, and fed back through a feedback path 46 is inputted, and measures the time difference between the input time of the reference clock signal to the input terminal a (a time when the rising edge of the reference clock signal is inputted) and the input time of the reference clock signal to the input terminal b (a time when the rising edge of the reference clock signal is inputted).

In addition, the TDC circuit 42 outputs the time difference information DLY_A indicative of the above time difference to the phase shifter adjustment circuit 5.

Note that the TDC circuit 42 constitutes a first time difference measurement circuit.

The TDC circuit 43 has an input terminal a (a first input terminal) to which the reference clock signal generated by the reference signal source 41 is directly inputted and an input terminal b (a second input terminal) to which the reference clock signal generated by the reference signal source 41, inputted to the signal source circuit 6 through a signal path 47, and fed back through a feedback path 48 is inputted, and measures the time difference between the input time of the reference clock signal to the input terminal a (the time when the rising edge of the reference clock signal is inputted) and the input time of the reference clock signal to the input terminal b (the time when the rising edge of the reference clock signal is inputted).

In addition, the TDC circuit 43 outputs the time difference information DLY_B indicative of the above time difference to the phase shifter adjustment circuit 9.

Note that the TDC circuit 43 constitutes a second time difference measurement circuit.

The subtractor 44 calculates the difference between half of the time difference measured by the TDC circuit 42 and half of the time difference measured by the TDC circuit 43.

The phase adjustment amount set by the phase shifter adjustment circuit 9 is different in comparison with the phase adjustment amount set by the phase shifter adjustment circuit 5 by the phase amount corresponding to the difference calculated by the subtractor 44.

Next, an operation thereof will be described.

The reference clock signal generated from the reference signal source 41 is inputted to each of the phase shifters 3 and 7 of the signal source circuits 2 and 6.

In addition, the reference clock signal from by the reference signal source 41 is directly inputted to each of the input terminals a of the TDC circuits 42 and 43.

Further, the reference clock signal generated from the reference signal source 41 is inputted to the signal source circuit 2 through the signal path 45, fed back to the reference clock signal generator 40 through the feedback path 46, and inputted to the input terminal b of the TDC circuit 42.

Similarly, the reference clock signal generated from the reference signal source 41 is inputted to the signal source circuit 6 through the signal path 47, fed back to the reference clock signal generator 40 through the feedback path 48, and inputted to the input terminal b of the TDC circuit 43.

The TDC circuit 42 measures the time difference between the input time of the reference clock signal to the input terminal a (the time when the rising edge of the reference clock signal is inputted) and the input time of the reference clock signal to the input terminal b (the time when the rising edge of the reference clock signal is inputted).

The time difference is the path delay time $\tau a1$ occurring in the signal path 45 and the feedback path 46, and the lengths of the signal path 45 and the feedback path 46 are the same, and hence the path delay time $\tau b1$ occurring in the signal path 45 is half of the path delay time $\tau a1$ occurring in the signal path 45 and the feedback path 46.

The TDC circuit 42 measures the path delay time $\tau a1$ occurring in the signal path 45 and the feedback path 46, and then outputs the time difference information DLY_A indicative of the path delay time $\tau a1$ to the phase shifter adjustment circuit 5.

When receiving the time difference information DLY_A from the TDC circuit 42, the phase shift adjustment circuit 5 sets the phase adjustment amount corresponding to the path delay time $\tau a1$ indicated by the time difference information DLY_A in the phase shifter 3.

The TDC circuit 43 measures the time difference between the input time of the reference clock signal to the input terminal a (the time when the rising edge of the reference clock signal is inputted) and the input time of the reference clock signal to the input terminal b (the time when the rising edge of the reference clock signal is inputted).

The time difference is the path delay time $\tau a2$ occurring in the signal path 47 and the feedback path 48, and the lengths of the signal path 47 and the feedback path 48 are the same, and hence the path delay time $\tau b2$ occurring in the signal path 47 is half of the path delay time $\tau a2$ occurring in the signal path 47 and the feedback path 48.

The TDC circuit 43 measures the path delay time $\tau a2$ occurring in the signal path 47 and the feedback path 48, and then outputs the time difference information DLY_B indicative of the path delay time $\tau a2$ to the phase shifter adjustment circuit 9.

When receiving the time difference information DLY_B from the TDC circuit 43, the phase shifter adjustment circuit 9 sets the phase adjustment amount corresponding to the path delay time $\tau a1$ indicated by the time difference information DLY_B in the phase shifter 7.

When the TDC circuit 42 measures the path delay time $\tau a1$ and the TDC circuit 43 measures the path delay time $\tau a2$, the subtractor 44 calculates the difference $\tau c$ between the path delay time $\tau b1$ that is half of the path delay time $\tau a1$ and the path delay time $\tau b2$ that is half of the path delay time $\tau a2$.

$$\tau c = \tau b1 - \tau b2 \qquad (3)$$

As described above, the phase shifter adjustment circuit 5 sets the phase adjustment amount corresponding to the path delay time $\tau a1$ in the phase shifter 3, and the phase shifter adjustment circuit 9 sets the phase adjustment amount corresponding to the path delay time $\tau a2$ in the phase shifter 7; however, the phase adjustment amount corresponding to the path delay time $\tau a2$ is different in comparison with the phase adjustment amount corresponding to the path delay time $\tau a1$ by the phase amount corresponding to the difference $\tau c$ calculated by the subtractor 44.

Specifically, in a case where the length of the signal path 45 and the feedback path 46 is longer than the length of the signal path 47 and the feedback path 48, and hence the path delay time $\tau a1$ is longer than the path delay time $\tau a2$, in order to cause the phases of the reference clock signals outputted from the phase shifters 3 and 7 to coincide with each other, the phase adjustment amount set in the phase shifter 7 is made larger than the phase adjustment amount set in the phase shifter 3 by the phase amount corresponding to the difference $\tau c$.

Conversely, in a case where the length of the signal path 47 and the feedback path 48 is longer than the length of the signal path 45 and the feedback path 46, and hence the path delay time $\tau a2$ is longer than the path delay time $\tau a1$, in order to cause the phases of the reference clock signals outputted from the phase shifters 3 and 7 to coincide with each other, the phase adjustment amount set in the phase shifter 3 is made larger than the phase adjustment amount set in the phase shifter 7 by the phase amount corresponding to the difference $\tau c$.

The phase shifter 3 of the signal source circuit 2 adjusts the phase of the reference clock signal generated by the reference signal source 1 by the phase adjustment amount set by the phase shifter adjustment circuit 5, and outputs the reference clock signal after the phase adjustment to the local oscillator 4.

When receiving the reference clock signal after the phase adjustment from the phase shifter 3, the local oscillator 4 of the signal source circuit 2 generates the signal synchronized with the reference clock signal.

The phase shifter 7 of the signal source circuit 6 adjusts the phase of the reference clock signal generated by the reference signal source 1 by the phase adjustment amount set by the phase shifter adjustment circuit 9, and outputs the reference clock signal after the phase adjustment to the local oscillator 8.

When receiving the reference clock signal after the phase adjustment from the phase shifter 7, the local oscillator 8 of the signal source circuit 6 generates the signal synchronized with the reference clock signal.

As is apparent from the foregoing, according to Embodiment 3, it is configured to include: the TDC circuit 42 that measures the path delay time $\tau a1$ that is the time difference between the input time of the reference clock signal to the input terminal a and the input time of the reference clock signal to the input terminal b; and the TDC circuit 43 that measures the path delay time $\tau a2$ that is the time difference between the input time of the reference clock signal to the input terminal a and the input time of the reference clock signal to the input terminal b, wherein the phase shifter adjustment circuit 5 sets the phase adjustment amount corresponding to the path delay time $\tau a1$ in the phase shifter 3, and the phase shifter adjustment circuit 9 sets the phase adjustment amount corresponding to the path delay time $\tau a2$ in the phase shifter 7, and hence the effect is achieved that it is possible to enhance the accuracy in the synchronization between the signal source circuit 2 and the signal source circuit 6 without mounting the trigger signal generation circuit 11.

Although Embodiment 3 has shown an example in which the phases of the signal generated by the signal source circuit 2 and the signal generated by the signal source circuit 6 are caused to coincide with each other, the phase adjustment amount of each of the phase shifters 3 and 7 may be set so that the phase difference between the two signals has a desired value.

Although Embodiment 3 has shown an example in which the signal path 45 and the feedback path 46 are different paths, the signal path 45 may also serve as the feedback path 46 in such a manner that a device that reflects the signal is provided at the end portion on the side of the signal source circuit 2 of the signal path 45.

Similarly, although Embodiment 3 has shown an example in which the signal path 47 and the feedback path 48 are different paths, the signal path 47 may also serve as the feedback path 48 in such a manner that a device that reflects the signal is provided at the end portion on the side of the signal source circuit 6 of the signal path 47.

Although Embodiment 3 has shown an example in which the frequencies of the reference clock signals passing through the signal path 45 and the feedback path 46 are the same, the frequencies of the reference clock signals passing through the signal path 45 and the feedback path 46 may be made different from each other in such a manner that, for example, a frequency converter is provided in the connection portion of the signal path 45 and the feedback path 46 in the signal source circuit 2 (or on the path of the signal path 45 or the feedback path 46).

Similarly, although Embodiment 3 has shown an example in which the frequencies of the reference clock signals passing through the signal path 47 and the feedback path 48 are the same, the frequencies of the reference clock signals passing through the signal path 47 and the feedback path 48 may be made different from each other in such a manner that, for example, a frequency converter provided in the connection portion of the signal path 47 and the feedback path 48 in the signal source circuit 6 (or on the path of the signal path 47 or the feedback path 48).

Although Embodiment 3 has shown an example in which the TDC circuits 42 and 43 measure the path delay times τa1 and τa2, in a case where the delay difference occurring between the signal source circuits 2 and 6 is sufficiently short relative to the cycle of the reference clock signal, even when a phase comparator is used instead of the TDC circuits 42 and 43, it is possible to measure the path delay times τa1 and τa2.

Although Embodiment 3 has shown an example in which the number of signal source circuits is two, the number of signal source circuits may be N (N is a natural number not less than 3).

In a case where the number of signal source circuits is N (in a case where there are N signal source circuits each corresponding to the signal source circuit 2), N TDC circuits are implemented (N TDC circuits each corresponding to the TDC circuit 12 are implemented).

At this point, the phase shifter adjustment circuit of the n-th (n=1, 2, . . . , N) signal source circuit adjusts the phase of the reference clock signal by setting the phase adjustment amount corresponding to the path delay time Tan that is the time difference measured by the n-th TDC circuit in the phase shifter.

Thus, even in the case where the number of signal source circuits is N, it is possible to obtain the same effect as in the case where the number of signal source circuits is two.

Although Embodiment 3 has shown an example in which each of the TDC circuits 42 and 43 captures the rising edge of the reference clock signal and the time difference is thereby measured, the time difference may be measured by capturing the falling edge of the reference clock signal.

Embodiment 4

Figure 4:
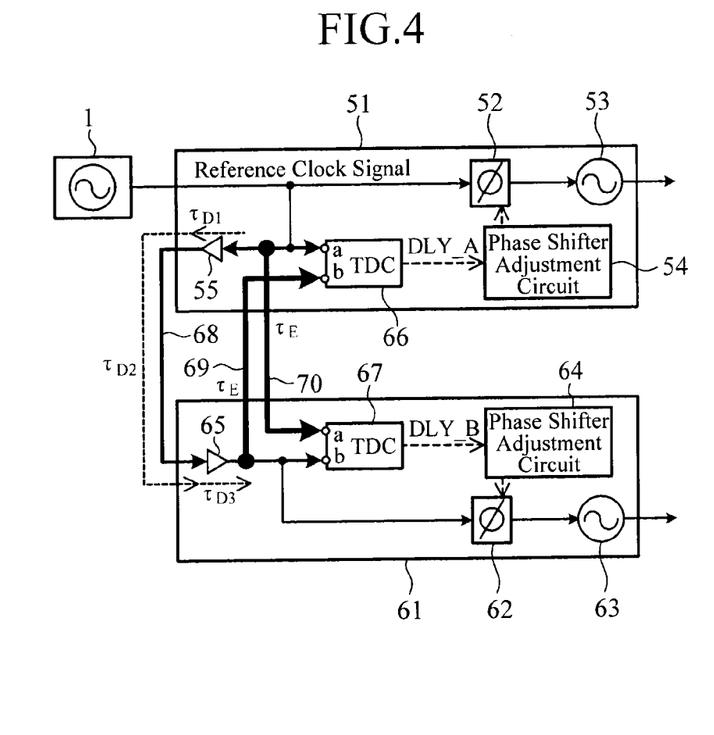
FIG. 4 is a block diagram showing a signal source synchronization circuit according to Embodiment 4 of the invention.

FIG. 4 is a block diagram showing a signal source synchronization circuit according to Embodiment 4 of the invention. In the drawing, the same reference numerals as those in FIG. 1 denote the same or equivalent portions, and hence descriptions thereof will be omitted.

A signal source circuit 51 is constituted by a phase shifter 52, a local oscillator 53, a phase shifter adjustment circuit 54, an output buffer 55, and a TDC circuit 66, adjusts the phase of the reference clock signal generated by the reference signal source 1, and generates the signal synchronized with the reference clock signal after the phase adjustment. Note that the signal source circuit 51 constitutes a first signal source circuit.

The phase shifter 52 of the signal source circuit 51 adjusts the phase of the reference clock signal generated by the reference signal source 1 by the phase adjustment amount set by the phase shifter adjustment circuit 54.

The local oscillator 53 generates the signal synchronized with the reference clock signal having the phase adjusted by the phase shifter 52.

The phase shifter adjustment circuit 54 sets the phase adjustment amount corresponding to the time difference indicated by the time difference information DLY_A outputted from the TDC circuit 66 in the phase shifter 52.

The output buffer 55 holds the reference clock signal generated by the reference signal source 1 for a path delay time $\tau_{D1}$ (a first delay time) and then outputs the reference clock signal.

A signal source circuit 61 is constituted by a phase shifter 62, a local oscillator 63, a phase shifter adjustment circuit 64, an input buffer 65, and a TDC circuit 67, holds the reference clock signal outputted from the signal source circuit 51 in the input buffer 65 for a path delay time $\tau_{D3}$ (a second delay time), adjusts the phase of the reference clock signal, and generates the signal synchronized with the reference clock signal after the phase adjustment. Note that the signal source circuit 61 constitutes a second signal source circuit.

The phase shifter 62 of the signal source circuit 61 adjusts the phase of the reference clock signal outputted from the input buffer 65 by the phase adjustment amount set by the phase shifter adjustment circuit 64.

The local oscillator 63 generates the signal synchronized with the reference clock signal having the phase adjusted by the phase shifter 62.

The phase shifter adjustment circuit 64 sets the phase adjustment amount corresponding to the time difference indicated by the time difference information DLY_B outputted from the TDC circuit 67 in the phase shifter 62.

The input buffer 65 holds the reference clock signal outputted from the signal source circuit 51 for the path delay time $\tau_{D3}$ and then outputs the signal.

The TDC circuit 66 is implemented in the signal source circuit 51, has an input terminal a (a first input terminal) to which the reference clock signal generated by the reference signal source 1 is directly inputted and an input terminal b (a second input terminal) to which the reference clock signal generated by the reference signal source 1, inputted to the signal source circuit 51, and fed back via the signal source circuit 61 is inputted, and measures the time difference between the input time of the reference clock signal to the input terminal a (the time when the rising edge of the reference clock signal is inputted) and the input time of the reference clock signal to the input terminal b (the time when the rising edge of the reference clock signal is inputted).

In addition, the TDC circuit 66 outputs the time difference information DLY_A indicative of the above time difference to the phase shifter adjustment circuit 54.

Note that the TDC circuit 66 constitutes a first time difference measurement circuit.

The TDC circuit 67 is implemented in the signal source circuit 61, has an input terminal a (a first input terminal) to which the reference clock signal generated by the reference signal source 1 and transmitted via the signal source circuit 51 without being held in the output buffer 55 for the path delay time $\tau_{D1}$ is inputted and an input terminal b (a second input terminal) to which the reference clock signal generated by the reference signal source 1 and transmitted after being held in the output buffer 55 and the input buffer 65 for the path delay times $\tau_{D1}$ and $\tau_{D3}$ is inputted, and measures the time difference between the input time of the reference clock signal to the input terminal a (the time when the rising edge of the reference clock signal is inputted) and the input time of the reference clock signal to the input terminal b (the time when the rising edge of the reference clock signal is inputted).

In addition, the TDC circuit 67 outputs the time difference information DLY_B indicative of the above time difference to the phase shifter adjustment circuit 64.

Note that the TDC circuit 67 constitutes a second time difference measurement circuit.

Next, an operation thereof will be described.

The reference clock signal generated from the reference signal source 1 is outputted to each of the phase shifter 52, the input terminal a of the TDC circuit 66, and the output buffer 55 of the signal source circuit 51.

In addition, the reference clock signal generated from the reference signal source 1 is inputted to the input terminal a of the TDC circuit 67 through a feedback correction path 70.

Further, the reference clock signal generated from the reference signal source 1 is held in the output buffer 55 for the path delay time $\tau_{D1}$, inputted to the input buffer 65 through a signal path 68, held in the input buffer 65 for the path delay time $\tau_{D3}$, and inputted to each of the input terminal b of the TDC circuit 67 and the phase shifter 62.

Furthermore, the reference clock signal held in the input buffer 65 for the path delay time $\tau_{D3}$ is fed back to the signal source circuit 51 through a feedback path 69, and inputted to the input terminal b of the TDC circuit 66.

The TDC circuit 66 measures the time difference between the input time of the reference clock signal to the input terminal a (the time when the rising edge of the reference clock signal is inputted) and the input time of the reference clock signal to the input terminal b (the time when the rising edge of the reference clock signal is inputted), and outputs the time difference information DLY_A indicative of the above time difference to the phase shifter adjustment circuit 54.

The reference clock signal inputted to the input terminal b includes the path delay time $\tau_{D1}$ during which the reference clock signal is held in the output buffer 55, the path delay time $\tau_{D2}$ occurring in the signal path 68, the path delay time $\tau_{D3}$ during which the reference clock signal is held in the input buffer 65, and a path delay time $\tau_E$ occurring in the feedback path 69.

Consequently, the time difference information DLY_A outputted to the phase shifter adjustment circuit 54 is represented by the following expression (4):

$$\text{DLY\_A} = (\tau_{D1} + \tau_{D2} + \tau_{D3} + \tau_E) - 0 \qquad (4)$$
$$= \tau_{D1} + \tau_{D2} + \tau_{D3} + \tau_E$$

The TDC circuit 67 measures the time difference between the input time of the reference clock signal to the input terminal a (the time when the rising edge of the reference clock signal is inputted) and the input time of the reference clock signal to the input terminal b (the time when the rising edge of the reference clock signal is inputted), and outputs the time difference information DLY_B indicative of the above time difference to the phase shifter adjustment circuit 64.

The reference clock signal inputted to the terminal a includes the path delay time $\tau_E$ occurring in the feedback correction path 70.

On the other hand, the reference clock signal inputted to the input terminal b includes the path delay time $\tau_{D1}$ during which the reference clock signal is held in the output buffer 55, the path delay time $\tau_{D2}$ occurring in the signal path 68, and the path delay time $\tau_{D3}$ during which the reference clock signal is held in the input buffer 65.

Consequently, the time difference information DLY_B outputted to the phase shifter adjustment circuit 64 is represented by the following expression (5):

$$\text{DLY\_B} = (\tau_{D1} + \tau_{D2} + \tau_{D3}) - \tau_E \qquad (5)$$
$$= \tau_{D1} + \tau_{D2} + \tau_{D3} - \tau_E$$

With the expressions (4) and (5), the total $\tau_D$ of the path delay time $\tau_{D1}$ during which the reference clock signal is held in the output buffer 55, the path delay time $\tau_{D2}$ occurring in the signal path 68, and the path delay time $\tau_{D3}$ during which the reference clock signal is held in the input buffer 65 is represented by the following expression (6):

$$\tau_D = \tau_{D1} + \tau_{D2} + \tau_{D3} \qquad (6)$$
$$= (\text{DLY\_A} + \text{DLY\_B})/2$$

Therefore, when the phase of the signal generated by the signal source circuit 51 is compared with the phase of the signal generated by the signal source circuit 61, it follows that the phases thereof are shifted from each other by the phase corresponding to the total path delay time $\tau_D$.

When receiving the time difference information DLY_A from the TDC circuit 66, the phase shifter adjustment circuit 54 of the signal source circuit 51 sets the phase adjustment amount corresponding to the path delay time indicated by the time difference information DLY_A in the phase shifter 52.

The phase shifter 52 of the signal source circuit 51 adjusts the phase of the reference clock signal generated by the reference signal source 1 by the phase adjustment amount set by the phase shifter adjustment circuit 51, and outputs the reference clock signal after the phase adjustment to the local oscillator 53.

When receiving the reference clock signal after the phase adjustment from the phase shifter 52, the local oscillator 53 of the signal source circuit 51 generates the signal synchronized with the reference clock signal.

When receiving the time difference information DLY_B from the TDC circuit 67, the phase shifter adjustment circuit 64 of the signal source circuit 61 sets the phase adjustment amount corresponding to the path delay time indicated by the time difference information DLY_B in the phase shifter 62.

The phase shifter 62 of the signal source circuit 61 adjusts the phase of the reference clock signal outputted from the signal source circuit 51 by the phase adjustment amount set by the phase shifter adjustment circuit 64, and outputs the reference clock signal after the phase adjustment to the local oscillator 63.

When receiving the reference clock signal after the phase adjustment from the phase shifter 62, the local oscillator 63 of the signal source circuit 61 generates the signal synchronized with the reference clock signal.

Thus, the phase of the reference clock signal by the phase shifter 62 of the signal source circuit 61 is advanced by the phase corresponding to the path delay time $\tau_D$ relative to the phase of the reference clock signal by the phase shifter 52 of the signal source circuit 51, and hence the phases of the signal generated by the signal source circuit 51 and the signal generated by the signal source circuit 61 can be caused to coincide with each other.

As is apparent from the foregoing, according to Embodiment 4, it is configured to include: the TDC circuit 66 that has the input terminal a to which the reference clock signal generated by the reference signal source 1 is directly inputted and the input terminal b to which the reference clock signal generated by the reference signal source 1, inputted to the signal source circuit 51, and fed back via the signal source circuit 61 is inputted, measures the time difference between the input time of the reference clock signal to the input terminal a and the input time of the reference clock signal to the input terminal b, and outputs the time difference information DLY_A indicative of the above time difference to the phase shifter adjustment circuit 54; and the TDC circuit 67 that has the input terminal a to which the reference clock signal generated by the reference signal source 1 and transmitted via the signal source circuit 51 without being held in the output buffer 55 for the path delay time $\tau_{D1}$ is inputted and the input terminal b to which the reference clock signal generated by the reference signal source 1 and transmitted after being held in the output buffer 55 and the input buffer 65 for the path delay times $\tau_{D1}$ and $\tau_{D3}$ is inputted, measures the time difference between the input time of the reference clock signal to the input terminal a and the input time of the reference clock signal to the input terminal b, and outputs the time difference information DLY_B indicative of the above time difference to the phase shifter adjustment circuit 64, and hence even in the case where the output buffer 55 and the input buffer 65 that delay the reference clock signal are implemented, there is rendered an advantageous effect such that accuracy in synchronization between the signal source circuit 51 and the signal source circuit 61 can be enhanced.

Although Embodiment 4 has shown an example in which the phases of the signal generated by the signal source circuit 51 and the signal generated by the signal source circuit 61 are caused to coincide with each other, the phase adjustment amount of each of the phase shifters 52 and 62 may be set so that the phase difference between the two signals has a desired value.

Although Embodiment 4 has shown an example in which the frequencies of the reference clock signals passing through the signal path 68, the feedback path 69, and the feedback correction path 70 are the same, the frequencies of the reference clock signals passing through the signal path 68, the feedback path 69, and the feedback correction path 70 may be made different from each other in such a manner that frequency converters are provided in the signal source circuits 51 and 61.

Although Embodiment 4 has shown an example in which each of the TDC circuits 66 and 67 measures the time difference, in a case where the delay difference occurring between the signal source circuits 51 and 61 is sufficiently short relative to the cycle of the reference clock signal, even when a phase comparator is used instead of the TDC circuits 66 and 67, it is possible to measure the time difference.

Although Embodiment 4 has shown an example in which the number of signal source circuits is two, the number of signal source circuits may be N (N is a natural number not less than 3).

In a case where the number of signal source circuits is N (in a case where there are N signal source circuits each corresponding to the signal source circuit 51), N TDC circuits are implemented (N TDC circuits each corresponding to the TDC circuit 66 are implemented).

At this point, the phase shifter adjustment circuit of the n-th (n=1, 2, . . . , N) signal source circuit adjusts the phase of the reference clock signal by setting the phase adjustment amount corresponding to the time difference measured by the n-th TDC circuit in the phase shifter.

Thus, even in the case where the number of signal source circuits is N, it is possible to obtain the same effect as in the case where the number of signal source circuits is two.

Although Embodiment 4 has shown an example in which each of the TDC circuits 66 and 67 captures the rising edge of the reference clock signal and the time difference is thereby measured, the time difference may be measured by capturing the falling edge of the reference clock signal.

Figure 5:
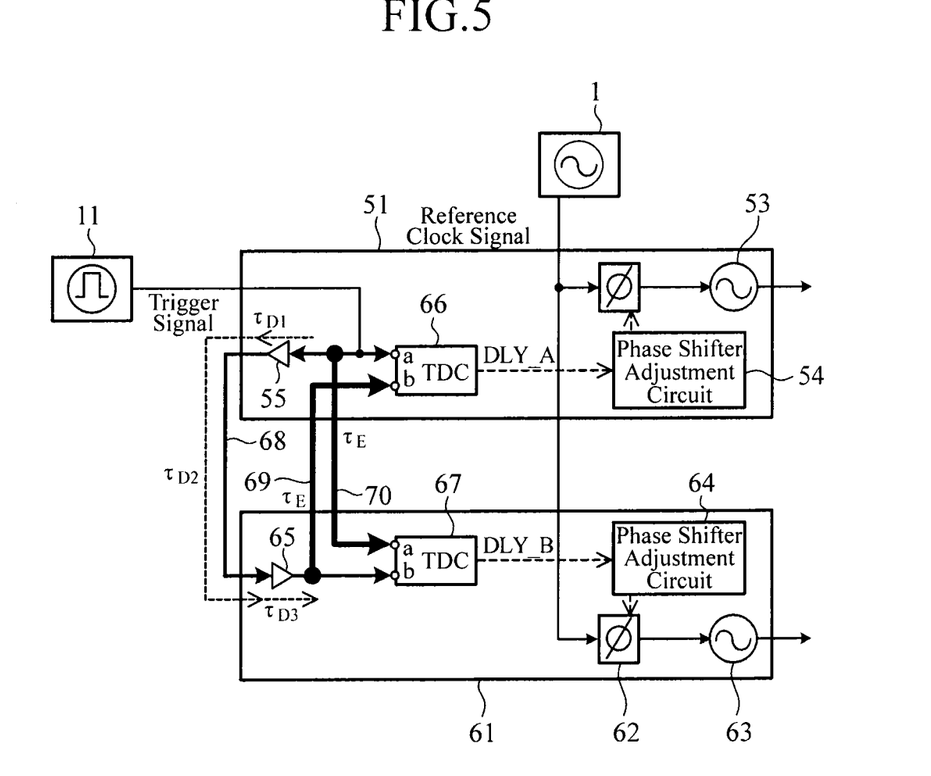
FIG. 5 is a block diagram showing another signal source synchronization circuit according to Embodiment 4 of the invention.

Although Embodiment 4 has shown the example in which each of the TDC circuits 66 and 67 captures the rising edge of the reference clock signal and the time difference is thereby measured, as shown in FIG. 5, the time difference may be measured by capturing the trigger signal outputted from the trigger signal generation circuit 11.

In this case, to the phase shifter 62 of the signal source circuit 61, the reference clock signal generated by the reference signal source 1 is directly inputted.

Embodiment 5

Although Embodiment 4 has shown an example in which the feedback path 69 and the feedback correction path 70 are different paths, in a case where there is a difference between the path delay times occurring in the feedback path 69 and the feedback correction path 70, the accuracy in synchronization is degraded.

Then, Embodiment 5 discloses a signal source synchronization circuit in which commonality of the feedback path 69 and the feedback correction path 70 is achieved and the path delay times thereof are made equal to each other.

Figure 6:
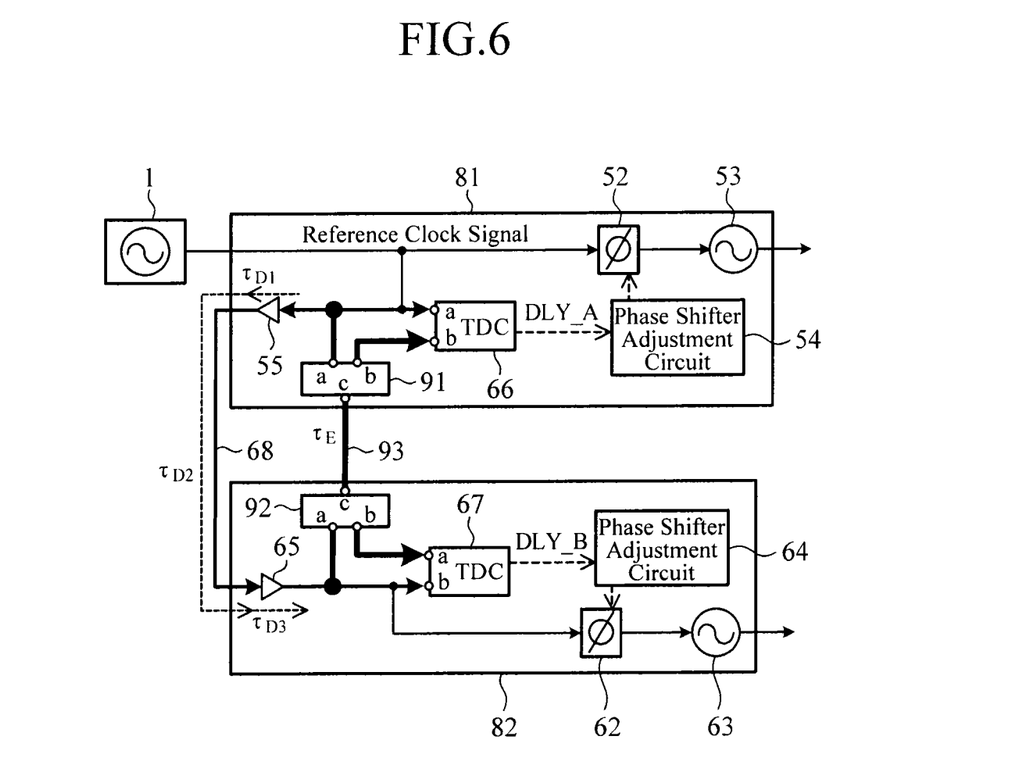
FIG. 6 is a block diagram showing a signal source synchronization circuit according to Embodiment 5 of the invention.

FIG. 6 is a block diagram showing the signal source synchronization circuit according to Embodiment 5 of the invention. In the drawing, the same reference numerals as those in FIG. 4 denote the same or equivalent portions, and hence descriptions thereof will be omitted.

A signal source circuit 81 is constituted by the phase shifter 52, the local oscillator 53, the phase shifter adjustment circuit 54, the output buffer 55, the TDC circuit 66, and a path switching switch 91, adjusts the phase of the reference clock signal generated by the reference signal source 1, and generates the signal synchronized with the reference clock signal after the phase adjustment. Note that the signal source circuit 81 constitutes a first signal source circuit.

In the path switching switch 91, a terminal a (a first terminal) is connected to the input terminal a of the TDC circuit 66, a terminal b (a second terminal) is connected to the input terminal b of the TDC circuit 66, and a terminal c (a third terminal) is connected to an input terminal c of a path switching switch 92.

Note that the path switching switch 91 constitutes a first path switching circuit.

A signal source circuit 82 is constituted by the phase shifter 62, the local oscillator 63, the phase shifter adjustment circuit 64, the input buffer 65, the TDC circuit 67, and the path switching switch 92, holds the reference clock signal outputted from the signal source circuit 81 in the input buffer 65 for the path delay time $\tau_{D3}$, adjusts the phase of the reference clock signal, and generates the signal synchronized with the reference clock signal after the phase adjustment. Note that the signal source circuit 82 constitutes a second signal source circuit.

In the path switching switch 92, a terminal a (a first terminal) is connected to the input terminal b of the TDC circuit 67, a terminal b (a second terminal) is connected to the input terminal a of the TDC circuit 67, and the terminal c (a third terminal) is connected to the terminal c of the path switching switch 91.

Note that the path switching switch 92 constitutes a second path switching circuit.

With regard to the path switching timing of each of the path switching switches 91 and 92, at the timing when the terminal a and the terminal c of the path switching switch 91 are connected to each other, the terminal b and the terminal c of the path switching switch 92 are connected to each other and, at the timing when the terminal b and the terminal c of the path switching switch 91 are connected to each other, the terminal a and the terminal c of the path switching switch 92 are connected to each other.

Next, an operation thereof will be described.

First, the terminal b and the terminal c of the path switching switch 91 are connected to each other, and the terminal a and the terminal c of the path switching switch 92 are connected to each other.

At this point, the reference clock signal generated from the reference signal source 1 is inputted to each of the phase shifter 52, the input terminal a of the TDC circuit 66, and the output buffer 55 of the signal source circuit 81.

In addition, the reference clock signal generated from the reference signal source 1 is held in the output buffer 55 for the path delay time $\tau_{D1}$, inputted to the input buffer 65 through the signal path 68, held in the input buffer 65 for the path delay time $\tau_{D3}$, and inputted to the input terminal b of the TDC circuit 66 through a feedback path 93.

The TDC circuit 66 measures the time difference between the input time of the reference clock signal to the input terminal a (the time when the rising edge of the reference clock signal is inputted) and the input time of the reference clock signal to the input terminal b (the time when the rising edge of the reference clock signal is inputted), and outputs the time difference information DLY_A indicative of the above time difference to the phase shifter adjustment circuit 54.

The reference clock signal inputted to the input terminal b includes the path delay time $\tau_{D1}$ during which the reference clock signal is held in the output buffer 55, the path delay time $\tau_{D2}$ occurring in the signal path 68, the path delay time $\tau_{D3}$ during which the reference clock signal is held in the input buffer 65, and the path delay time $\tau_E$ occurring in the feedback path 93.

For this reason, the time difference information DLY_A outputted to the phase shifter adjustment circuit 54 is represented by the following expression (7):

$$DLY\_A = (\tau_{D1} + \tau_{D2} + \tau_{D3} + \tau_E) - 0 \qquad (7)$$
$$= \tau_{D1} + \tau_{D2} + \tau_{D3} + \tau_E$$

Next, the terminal a and the terminal c of the path switching switch 91 are connected to each other, and the terminal b and the terminal c of the path switching switch 92 are connected to each other.

At this point, the reference clock signal generated from the reference signal source 1 is inputted to each of the output buffer 55 and the terminal a of the path switching switch 91 of the signal source circuit 81.

In addition, the reference clock signal generated from the reference signal source 1 is inputted to the input terminal a of the TDC circuit 67 through the feedback path 93.

Further, the reference clock signal generated from the reference signal source 1 is held in the output buffer 55 for the path delay time $\tau_{D1}$, inputted to the input buffer 65 through the signal path 68, held in the input buffer 65 for the path delay time $\tau_{D3}$, and then inputted to each of the input terminal b of the TDC circuit 67 and the phase shifter 62.

The TDC circuit 67 measures the time difference between the input time of the reference clock signal to the input terminal a (the time when the rising edge of the reference clock signal is inputted) and the input time of the reference clock signal to the input terminal b (the time when the rising edge of the reference clock signal is inputted), and outputs the time difference information DLY_B indicative of the above time difference to the phase shifter adjustment circuit 64.

The reference clock signal inputted to the input terminal a includes the path delay time $\tau_E$ occurring in the feedback path 93.

On the other hand, the reference clock signal inputted to the input terminal b includes the path delay time $\tau_{D1}$ during which the reference clock signal is held in the output buffer 55, the path delay time $\tau_{D2}$ occurring in the signal path 68, and the path delay time $\tau_{D3}$ during which the reference clock signal is held in the input buffer 65.

For this reason, the time difference information DLY_B outputted to the phase shifter adjustment circuit 64 is represented by the following expression (8):

$$DLY\_B = (\tau_{D1} + \tau_{D2} + \tau_{D3}) - \tau_E \qquad (8)$$
$$= \tau_{D1} + \tau_{D2} + \tau_{D3} - \tau_E$$

With the expressions (7) and (8), the total $\tau_D$ of the path delay time $\tau_{D1}$ during which the reference clock signal is held in the output buffer 55, the path delay time $\tau_{D2}$ occurring in the signal path 68, and the path delay time $\tau_{D3}$ during which the reference clock signal is held in the input buffer 65 is represented by the following expression (9):

$$\tau_D = \tau_{D1} + \tau_{D2} + \tau_{D3} \qquad (9)$$
$$= (DLY\_A + DLY\_B)/2$$

Therefore, when the phase of the signal generated by the signal source circuit 81 is compared with the phase of the signal generated by the signal source circuit 82, it follows that the phases thereof are shifted from each other by the phase corresponding to the total path delay time $\tau_D$.

When receiving the time difference information DLY_A from the TDC circuit 66, the phase shifter adjustment circuit 54 of the signal source circuit 81 sets the phase adjustment amount corresponding to the path delay time indicated by the time difference information DLY_A in the phase shifter 52.

The phase shifter 52 of the signal source circuit 81 adjusts the phase of the reference clock signal generated by the reference signal source 1 by the phase adjustment amount set by the phase shifter adjustment circuit 54, and outputs the reference clock signal after the phase adjustment to the local oscillator 53.

When receiving the reference clock signal after the phase adjustment from the phase shifter 52, the local oscillator 53 of the signal source circuit 81 generates the signal synchronized with the reference clock signal.

When receiving the time difference information DLY_B from the TDC circuit 67, the phase shifter adjustment circuit 64 of the signal source circuit 82 sets the phase adjustment amount corresponding to the path delay time indicated by the time difference information DLY_B in the phase shifter 62.

The phase shifter 62 of the signal source circuit 82 adjusts the phase of the reference clock signal outputted from the signal source circuit 81 by the phase adjustment amount set by the phase shifter adjustment circuit 64, and outputs the reference clock signal after the phase adjustment to the local oscillator 63.

When receiving the reference clock signal after the phase adjustment from the phase shifter 62, the local oscillator 63 of the signal source circuit 82 generates the signal synchronized with the reference clock signal.

Thus, the phase of the reference clock signal by the phase shifter 62 of the signal source circuit 82 is advanced by the phase corresponding to the path delay time $\tau_D$ relative to the phase of the reference clock signal by the phase shifter 52 of the signal source circuit 81, and hence it is possible to cause the phases of the signal generated by the signal source circuit 81 and the signal generated by the signal source circuit 82 to coincide with each other.

As is apparent from the foregoing, according to Embodiment 5, the path switching switch 91 having the terminal a connected to the input terminal a of the TDC circuit 66 and the terminal b connected to the input terminal b of the TDC circuit 66 is implemented in the signal source circuit 81; the path switching switch 92 having the terminal a connected to the input terminal b of the TDC circuit 67, the terminal b connected to the input terminal a of the TDC circuit 67, and the terminal c connected to the terminal c of the path switching switch 91 is implemented in the signal source circuit 82; and the terminal b and the terminal c of the path switching switch 92 are connected to each other at the timing when the terminal a and the terminal c of the path switching switch 91 are connected to each other and the terminal a and the terminal c of the path switching switch 92 are connected to each other at the timing when the terminal b and the terminal c of the path switching switch 91 are connected to each other, so that the feedback path 69 and the feedback correction path 70 shown in FIG. 4 are shared, and hence even in a case where there is a difference between the path delay times occurring in the feedback path 69 and the feedback correction path 70, there is rendered an advantageous effect such that synchronization with high accuracy can be achieved.

Although Embodiment 5 has shown an example in which the phases of the signal generated by the signal source circuit 81 and the signal generated by the signal source circuit 82 are caused to coincide with each other, the phase adjustment amount of each of the phase shifters 52 and 62 may be set so that the phase difference between the two signals has a desired value.

Although Embodiment 5 has shown an example in which the frequencies of the reference clock signals passing through the signal path 68 and the feedback path 93 are the same, the frequencies of the reference clock signals passing through the signal path 68 and the feedback path 93 may be made different from each other in such a manner that frequency converters are provided in the signal source circuits 81 and 82.

Although Embodiment 5 has shown an example in which each of the TDC circuits 66 and 67 measures the time difference, in a case where the delay difference occurring between the signal source circuits 81 and 82 is sufficiently short relative to the cycle of the reference clock signal, even when a phase comparator is used instead of the TDC circuits 66 and 67, it is possible to measure the time difference.

Although Embodiment 5 has shown an example in which the number of signal source circuits is two, the number of signal source circuits may be N (N is a natural number not less than 3).

In a case where the number of signal source circuits is N (in a case where there are N signal source circuits each corresponding to the signal source circuit 81), N TDC circuits are implemented (N TDC circuits each corresponding to the TDC circuit 66 are implemented).

At this point, the phase shifter adjustment circuit of the n-th (n=1, 2, . . . , N) signal source circuit adjusts the phase of the reference clock signal by setting the phase adjustment amount corresponding to the time difference measured by the n-th TDC circuit in the phase shifter.

Thus, even in the case where the number of signal source circuits is N, it is possible to obtain the same effect as that in the case where the number of signal source circuits is two.

Although Embodiment 5 has shown an example in which each of the TDC circuits 66 and 67 captures the rising edge of the reference clock signal to thereby measure the time difference, the time difference may be measured in such a manner that the falling edge of the reference clock signal is captured.

Figure 7:
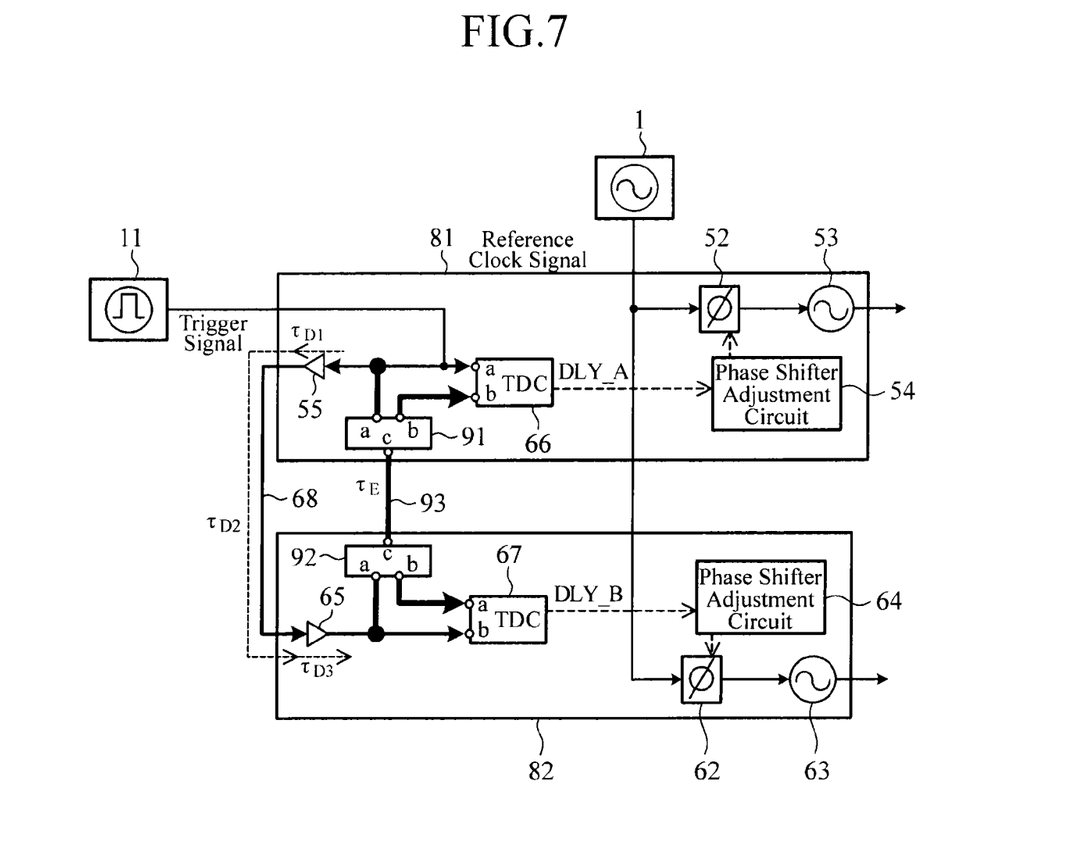
FIG. 7 is a block diagram showing another signal source synchronization circuit according to Embodiment 5 of the invention.

Although Embodiment 5 has shown the example in which each of the TDC circuits 66 and 67 captures the rising edge of the reference clock signal to thereby measure the time difference, as shown in FIG. 7, the time difference may be measured in such a manner that the trigger signal outputted from the trigger signal generation circuit 11 is captured.

In this case, the reference clock signal generated by the reference signal source 1 is directly inputted to the phase shifter 62 of the signal source circuit 82.

It is noted that in the invention, it is possible to freely combine the embodiments, modify any component of the embodiments, or omit any component in the embodiments within the scope of the invention.

What is claimed is:

1. A signal source synchronization circuit comprising:
a reference signal source that generates a reference signal;
a first signal source circuit that adjusts a phase of the reference signal generated by the reference signal source and generates a signal synchronized with the reference signal after the phase adjustment;
a second signal source circuit that adjusts a phase of the reference signal generated by the reference signal source and generates a signal synchronized with the reference signal after the phase adjustment;
a trigger signal generation circuit that outputs a trigger signal;
a first time difference measurement circuit that has a first input terminal to which the trigger signal outputted from the trigger signal generation circuit is directly inputted and a second input terminal to which the trigger signal outputted from the trigger signal generation circuit and then fed back via the first signal source circuit is inputted, and measures a time difference between an input time of the trigger signal to the first input terminal and an input time of the trigger signal to the second input terminal; and a second time difference measurement circuit that has a first input terminal to which the trigger signal outputted from the trigger signal generation circuit is directly inputted and a second input terminal to which the trigger signal outputted from the trigger signal generation circuit and then fed back via the second signal source circuit is inputted, and measures a time difference between an input time of the trigger signal to the first input terminal and an input time of the trigger signal to the second input terminal, wherein the first signal source circuit adjusts the phase of the reference signal according to the time difference measured by the first time difference measurement circuit, and the second signal source circuit adjusts the phase of the reference signal according to the time difference measured by the second time difference measurement circuit.

2. The signal source synchronization circuit according to claim 1, wherein an adjustment amount of the phase by the second signal source circuit is different in comparison with an adjustment amount of the phase by the first signal source circuit by a phase amount corresponding to half of a difference between the time difference measured by the first time difference measurement circuit and the time difference measured by the second time difference measurement circuit.

3. The signal source synchronization circuit according to claim 1, wherein the time difference measurement circuit includes a Time to Digital Converter (TDC) circuit or a phase comparator.

4. The signal source synchronization circuit according to claim 1, further comprising a frequency converter that converts a frequency of the trigger signal is provided in a signal path through which the trigger signal outputted from the trigger signal generation circuit is transmitted.

5. The signal source synchronization circuit according to claim 1, wherein, in a case where the number of the signal source circuits is not two but N (N is a natural number not less than 3), the first to N-th signal source circuits are implemented, the first to N-th time difference measurement circuits are implemented, and an n-th (n=1, 2, . . . , N) signal source circuit adjusts the phase of the reference signal according to a time difference measured by an n-th time difference measurement circuit.

6. The signal source synchronization circuit according to claim 1, further comprising:
a first signal path that transmits the trigger signal from the trigger signal generation circuit to the first signal source circuit;
a first feedback path that transmits the trigger signal from the first signal source circuit to the trigger signal generation circuit, the first feedback path having the same length as the first signal path;
a second signal path that transmits the trigger signal from the trigger signal generation circuit to the second signal source circuit; and
a second feedback path that transmits the trigger signal from the second signal source circuit to the trigger signal generation circuit, the second feedback path having the same length as the second signal path,
wherein the trigger signal to be input to the second input terminal of the first time difference measurement circuit is transmitted through the first signal path and the first feedback path, and wherein the trigger signal to be input to the second input terminal of the second time difference measurement circuit is transmitted through the second signal path and the second feedback path.

7. A signal source synchronization circuit comprising:
a reference signal source that generates a reference signal;
a first signal source circuit that adjusts a phase of the reference signal generated by the reference signal source and generates a signal synchronized with the reference signal after the phase adjustment;
a second signal source circuit that adjusts a phase of the reference signal generated by the reference signal source and generates a signal synchronized with the reference signal after the phase adjustment;
a trigger signal generation circuit that outputs a trigger signal; and
a time difference measurement circuit that is implemented in the first signal source circuit, has a first input terminal to which the trigger signal outputted from the trigger signal generation circuit is directly inputted and a second input terminal to which the trigger signal outputted from the trigger signal generation circuit and inputted to the first signal source circuit, and then fed back via the second signal source circuit is inputted, and measures a time difference between an input time of the trigger signal to the first input terminal and an input time of the trigger signal to the second input terminal, wherein the second signal source circuit adjusts the phase of the reference signal according to the time difference measured by the time difference measurement circuit.

8. The signal source synchronization circuit according to claim 7, wherein an adjustment amount of the phase by the second signal source circuit is different in comparison with an adjustment amount of the phase by the first signal source circuit by a phase amount corresponding to half of the time difference measured by the time difference measurement circuit.

9. The signal source synchronization circuit according to claim 7, wherein, in a case where the number of the signal source circuits is not two but N (N is a natural number not less than 3), the first to N-th signal source circuits are implemented, the time difference measurement circuit has a first input terminal to which the trigger signal outputted from the trigger signal generation circuit is directly inputted and a second input terminal to which the trigger signal outputted from the trigger signal generation circuit, inputted to the first signal source circuit, and then fed back via an n-th (n=1, 2, 3, . . . , N) signal source circuit is inputted and measures a time difference between an input time of the trigger signal to the first input terminal and an input time of the trigger signal to the second input terminal, and the n-th signal source circuit adjusts the phase of the reference signal according to the time difference measured by the time difference measurement circuit.

10. The signal source synchronization circuit according to claim 7, further comprising:
a signal path that transmits the trigger signal from the first signal source circuit to the second signal source circuit; and
a feedback path that transmits the trigger signal from the second signal source circuit to the first signal source circuit, the feedback path having the same length as the signal path, wherein the trigger signal to be input to the second input terminal of the time difference measurement circuit is transmitted through the signal path and the feedback path.

11. A signal source synchronization circuit comprising:
a reference signal source that generates a reference signal;
a first signal source circuit that adjusts a phase of the reference signal generated by the reference signal source and generates a signal synchronized with the reference signal after the phase adjustment;
a second signal source circuit that adjusts a phase of the reference signal generated by the reference signal source and generates a signal synchronized with the reference signal after the phase adjustment;
a first time difference measurement circuit that has a first input terminal to which the reference signal generated by the reference signal source is directly inputted and a second input terminal to which the reference signal generated by the reference signal source and then fed back via the first signal source circuit is inputted, and measures a time difference between an input time of the reference signal to the first input terminal and an input time of the reference signal to the second input terminal; and
a second time difference measurement circuit that has a first input terminal to which the reference signal generated by the reference signal source is directly inputted and a second input terminal to which the reference signal generated by the reference signal source and then fed back via the second signal source circuit is inputted, and measures a time difference between an input time of the reference signal to the first input terminal and an input time of the reference signal to the second input terminal, wherein
the first signal source circuit adjusts the phase of the reference signal according to the time difference measured by the first time difference measurement circuit, and
the second signal source circuit adjusts the phase of the reference signal according to the time difference measured by the second time difference measurement circuit.

12. The signal source synchronization circuit according to claim 11, wherein an adjustment amount of the phase by the second signal source circuit is different in comparison with an adjustment amount of the phase by the first signal source circuit by a phase amount corresponding to half of a difference between the time difference measured by the first time difference measurement circuit and the time difference measured by the second time difference measurement circuit.

13. The signal source synchronization circuit according to claim 11, further comprising a frequency converter that converts a frequency of the reference signal is provided in a signal path through which the reference signal generated by the reference signal source is transmitted.

14. The signal source synchronization circuit according to claim 11, further comprising:
a reference signal generator that includes the reference signal source, the first time difference measurement circuit, and the second time difference measurement circuit;
a first signal path that transmits the reference signal from the reference signal generator to the first signal source circuit;
a first feedback path that transmits the reference signal from the first signal source circuit to the reference signal generator, the first feedback path having the same length as the first signal path;
a second signal path that transmits the reference signal from the reference signal generator to the second signal source circuit; and
a second feedback path that transmits the reference signal from the second signal source circuit to the reference signal generator, the second feedback path having the same length as the second signal path,
wherein the reference signal to be input to the second input terminal of the first time difference measurement circuit is transmitted through the first signal path and the first feedback path, and
wherein the reference signal to be input to the second input terminal of the second time difference measurement circuit is transmitted through the second signal path and the second feedback path.

15. A signal source synchronization circuit comprising:
a reference signal source that generates a reference signal;
a first signal source circuit that adjusts a phase of the reference signal generated by the reference signal source, and generates a signal synchronized with the reference signal after the phase adjustment, and that also outputs the reference signal before the phase adjustment after holding the reference signal before the phase adjustment in a first buffer circuit for a first delay time;
a second signal source circuit that holds the reference signal outputted from the first signal source circuit in a second buffer circuit for a second delay time, then adjusts a phase of the reference signal, and generates a signal synchronized with the reference signal after the phase adjustment;
a first time difference measurement circuit that is implemented in the first signal source circuit, has a first input terminal to which the reference signal generated by the reference signal source is directly inputted and a second input terminal to which the reference signal generated by the reference signal source and inputted to the first signal source circuit, and then fed back via the second signal source circuit is inputted, and measures a time difference between an input time of the reference signal to the first input terminal and an input time of the reference signal to the second input terminal; and
a second time difference measurement circuit that is implemented in the second signal source circuit, has a first input terminal to which the reference signal generated by the reference signal source and transmitted via the first signal source circuit without being held in the first buffer circuit for the first delay time is inputted and a second input terminal to which the reference signal generated by the reference signal source and then transmitted after being held in the first and second buffer circuits for the first and second delay times is inputted, and measures a time difference between an input time of the reference signal to the first input terminal and an input time of the reference signal to the second input terminal, wherein
the first signal source circuit adjusts the phase of the reference signal according to the time difference measured by the first time difference measurement circuit, and
the second signal source circuit adjusts the phase of the reference signal according to the time difference measured by the second time difference measurement circuit.

16. The signal source synchronization circuit according to claim 15, wherein an adjustment amount of the phase by the second signal source circuit is different in comparison with an adjustment amount of the phase by the first signal source circuit by a phase amount corresponding to half of a total sum of the time difference measured by the first time difference measurement circuit and the time difference measured by the second time difference measurement circuit.

17. The signal source synchronization circuit according to claim 15, wherein
the first signal source circuit includes a first path switching circuit and the second signal source circuit includes a second path switching circuit;
a first terminal of the first path switching circuit is connected to the first input terminal of the first time difference measurement circuit and a second terminal of the first path switching circuit is connected to the second input terminal of the first time difference measurement circuit;
a first terminal of the second path switching circuit is connected to the second input terminal of the second time difference measurement circuit, a second terminal of the second path switching circuit is connected to the first input terminal of the second time difference measurement circuit, and a third terminal of the second path switching circuit is connected to a third terminal of the first path switching circuit;
the second terminal and the third terminal of the second path switching circuit are connected to each other at a timing when the first terminal and the third terminal of the first path switching circuit are connected to each other, and
the first terminal and the third terminal of the second path switching circuit are connected to each other at a timing when the second terminal and the third terminal of the first path switching circuit are connected to each other.

18. A signal source synchronization circuit comprising:
a reference signal source that generates a reference signal;
a trigger signal generation circuit that outputs a trigger signal;
a first signal source circuit that adjusts a phase of the reference signal generated by the reference signal source, and generates a signal synchronized with the reference signal after the phase adjustment, while outputting the trigger signal outputted from the trigger signal generation circuit after holding the trigger signal in a first buffer circuit for a first delay time;
a second signal source circuit that adjusts a phase of the reference signal generated by the reference signal source, and generates a signal synchronized with the reference signal after the phase adjustment, while outputting the trigger signal outputted from the first signal source circuit after holding the trigger signal in a second buffer circuit for a second delay time;
a first time difference measurement circuit that is implemented in the first signal source circuit, has a first input terminal to which the trigger signal outputted from the trigger signal generation circuit is directly inputted and a second input terminal to which the trigger signal outputted from the trigger signal generation circuit, inputted to the first signal source circuit, and then fed back via the second signal source circuit is inputted, and measures a time difference between an input time of the trigger signal to the first input terminal and an input time of the trigger signal to the second input terminal; and
a second time difference measurement circuit that is implemented in the second signal source circuit, has a first input terminal to which the trigger signal outputted from the trigger signal generation circuit and then transmitted via the first signal source circuit without being held in the first buffer circuit for the first delay time is inputted and a second input terminal to which the trigger signal outputted from the trigger signal generation circuit and then transmitted after being held in the first and second buffer circuits for the first and second delay times is inputted, and measures a time difference between an input time of the trigger signal to the first input terminal and an input time of the trigger signal to the second input terminal, wherein
the first signal source circuit adjusts the phase of the reference signal according to the time difference measured by the first time difference measurement circuit, and
the second signal source circuit adjusts the phase of the reference signal according to the time difference measured by the second time difference measurement circuit.

* * * * *